United States Patent [19]

Feuerstake et al.

[11] 4,293,775

[45] Oct. 6, 1981

[54] OZONE PIPE FOR OZONE PRODUCTION PLANT

[75] Inventors: Ewald Feuerstake, Dorsten; Klaus Schwarz, Neukirchen-Vluyn, both of Fed. Rep. of Germany

[73] Assignee: Mannesmann DeMag AG, Duisburg, Fed. Rep. of Germany

[21] Appl. No.: 93,384

[22] Filed: Nov. 13, 1979

[30] Foreign Application Priority Data

Dec. 13, 1978 [DE] Fed. Rep. of Germany ....... 2853749

[51] Int. Cl.³ .......................... C01B 13/11; B01J 19/12
[52] U.S. Cl. .................................... 250/535; 250/539; 250/540
[58] Field of Search ............... 250/532, 535, 537, 539, 250/540; 315/58, 127

[56] References Cited

U.S. PATENT DOCUMENTS

| | | | |
|---|---|---|---|
| 4,048,668 | 9/1977 | VonBargen et al. | 250/539 |
| 4,156,653 | 5/1979 | McKnight | 250/535 |

FOREIGN PATENT DOCUMENTS

| | | | |
|---|---|---|---|
| 1085860 | 7/1960 | Fed. Rep. of Germany. | |
| 1467021 | 10/1969 | Fed. Rep. of Germany | 250/539 |
| 2150919 | 4/1972 | Fed. Rep. of Germany | 250/539 |
| 2343351 | 11/1977 | France | 250/535 |
| 1227954 | 4/1971 | United Kingdom | 250/532 |

*Primary Examiner*—Deborah L. Kyle
*Attorney, Agent, or Firm*—Mandeville and Schweitzer

[57] ABSTRACT

An ozone pipe is provided for use in a large production plant employing a large number of such pipes in parallel. The pipe of the invention avoids the usual drawbacks for such pipes in large plants in having the metal electrodes melt without discharge of the fuse, or having the fuses discharge in a large number of pipes simultaneously without any indication in the glass pipes of the cause. The above is achieved by the use of a fuse with a capacity within the range of between about 0.63 and 0.15 amperes, and by providing a resistance in each tube mounted in series with the fuse in the power supply.

5 Claims, 2 Drawing Figures

OZONE PIPE FOR OZONE PRODUCTION PLANT

BACKGROUND AND STATEMENT OF THE INVENTION

The invention refers to an ozone pipe for use in an ozone production plant, wherein a plurality of ozone pipes are connected in parallel. Each is provided with a tubular dielectric material encased by a metal jacket electrode, as well as with a high voltage fuse arranged in the interior of the dielectric material and interpolated into the current supply leading to the metal coating of the dielectric material. The high voltage fuse switches off the respective ozone pipe in case of electric overload. The fuse is combined into a structural unit with the dielectric material and the contacts for the current supply.

In the past, it was customary to provide such an ozone pipe with a high voltage fuse arranged in the interior of the tubular dielectric material, as shown in German DE-PS 1 085 860. The fuse consists essentially of a fusion conductor interpolated between the current supply and the metal coating of the dielectric material.

The high voltage fuse guarantees keeping the plant in working order, even during failure of one or several ozone pipes. If short-circuits occur, such as due to bursting of the dielectric material, formation of dust bridges or moisture deposits between the electrodes, etc., the fusion conductor is destroyed by the resulting electric charge exceeding the normal value, thus switching off or disconnecting the respective ozone pipe from the circuit.

Experience has shown that conventional ozone production plants, in the past, provided, for example, with a cutoff current of 1 A in high voltage fuses of the kind mentioned, functioned without any disturbances. However, in the presently constructed larger plants with a great number of ozone pipes—in the order of several hundred—the following disturbances have arisen in series without any discernible reason being understood at the present time:

(a) metal electrodes were melted by an electric arc without the fuses first being activated; and
(b) fuses were activated in large numbers with intact glass pipes.

The melting of metal electrodes without cutoff of the circuit by the fuses leads one to conclude that the quick 1 A fuses utilized were too large, while the disconnecting of intact glass pipes points to an insufficient dimensioning of the same fuses.

When investigating these problems in an ozone production plant with 300 ozone pipes of 15,000 volts, a medium effective current of 230 vA per pipe, whereby the high voltage fuses consisted of fusion conductors of a cutoff current of 1A, the following was found: Due to the transformer dimensioned in accordance with the size of the plant, if a glass pipe suddenly becomes defective, there was, at the breaking point of the glass, a much greater energy in the form of an electric arc transmitted to the metal pipe than was the case in the smaller plants. The given rated voltage and an increased rated current result in an output transmitted by the electric arc of about 25 kW. The current-time period characteristic of a 1 A fuse, however, indicates that the cutoff with a 1.7 rated current only takes place after 10 minutes. This makes the power transmitted to the metal pipe by the electric arc sufficient to melt the pipe without having the fuse disconnect in time.

When investigating the second undesired condition, it was found that the fuses disconnect the circuit with intact glass pipes, if sufficient individual charges otherwise statistically distributed over a period coincide at one point in time. The frequency of the periodic coincidence of individual charges at one point in time increases naturally with the number of the ozone pipes, so that large ozone plants are more susceptible. In such a case, the condenser or glass pipe which has been partially to completely discharged, acts with the presently existing high voltage as a short-circuit, and the resulting charges, brief but extremely high, destroy the fuse. The type of damage to the fuses would point to the conclusion that the peak current values may reach several hundred amperes.

It is the object of the invention to provide an ozone pipe of the type mentioned initially, which is constructed to increase substantially the safety of operation in a large ozone production plant. In particular, on the one hand, the fuse provides a safe decoupling of individual pipes in the case of a disturbance, thus avoiding melting of the metal electrode, and on the other hand, any unwarranted cutoff of intact pipes is eliminated.

The invention accomplishes this in an ozone production plant with a large number of ozone pipes—on the order of several hundred—by providing each ozone pipe with a high voltage fuse with a cutoff current of 0.63 to 0.15 A. (amperes), and additionally with a resistance being provided in series. By the arrangement of resistances, the occurrence of high peak currents is limited by means of electric compensation processes between the glass pipes. Simultaneously, this provides the solution to the second problem, in that the melting of metal tubes is avoided without interrupting the circuit by means of the fuse. The high voltage fuses of lower cutoff power are utilized, guaranteeing certain cutoff of the individual pipe with a short-term overload.

Of particular advantage is the use of elements which change their resistance depending on the current, such as cold conductors or semi-conductors. This guarantees smooth operation of an ozone production plant. The additional energy requirement caused by the resistance amounts to about 2 to 3%. This increase in operating costs is negligible in view of the previously occurring damages.

Since the arrangement of the pipe with the additional resistance permits the generation of additional heat, the pipe is cooled without the use of a supplemental cooling agent. The front of the glass pipe forming the dielectric material, on the end facing away from the current supply, has a nozzle for the supplied medium or agent to be ozonized (air and/or gas). The glass pipe is open at the current supply end, and the annular discharge chamber between the glass pipe and the metal electrode serves as return line for the medium emerging from the glass pipe.

The invention is explained by means of the attached schematic drawings.

DETAILED DESCRIPTION OF THE INVENTION

Figure 1:
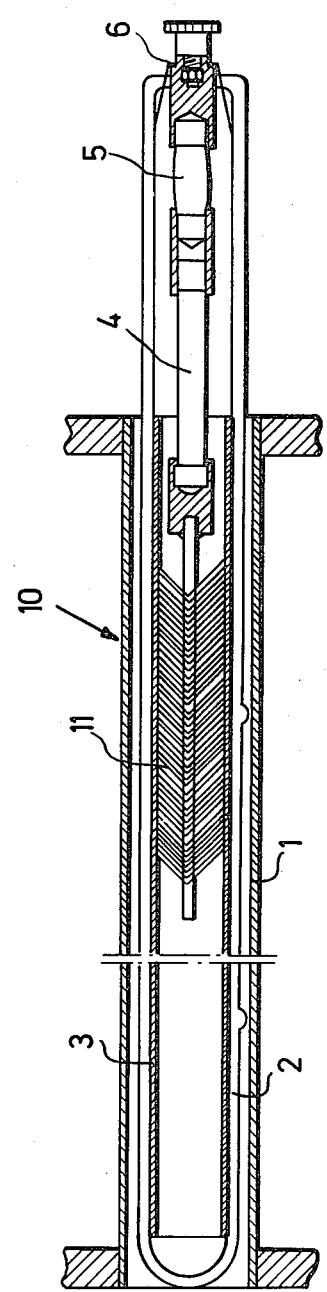
FIG. 1 shows a longitudinal axial sectional view of an ozone pipe illustrating the invention.

As shown in FIG. 1, ozone pipe 10 is shown and 2 stands for a tubular universally closed dielectric material consisting of glass which is supported in a metal jacket electrode 1 by means of a fixture, not shown. The dielectric material 2 is provided with a metal coating (high voltage counter electrode) 3 at its interior jacket surface. To transmit the high voltage from the supply to the metal coating 3, brushes 11 are arranged in the interior of the dielectric material. A high voltage fuse 4 is connected in the current supply to the brushes 11. The example shown has a high voltage fuse with a cutoff current of 0.2 A. A resistance in the form of a cold conductor 5 is connected between the high voltage fuse 4 and a contact 6 for the current supply.

Figure 2:
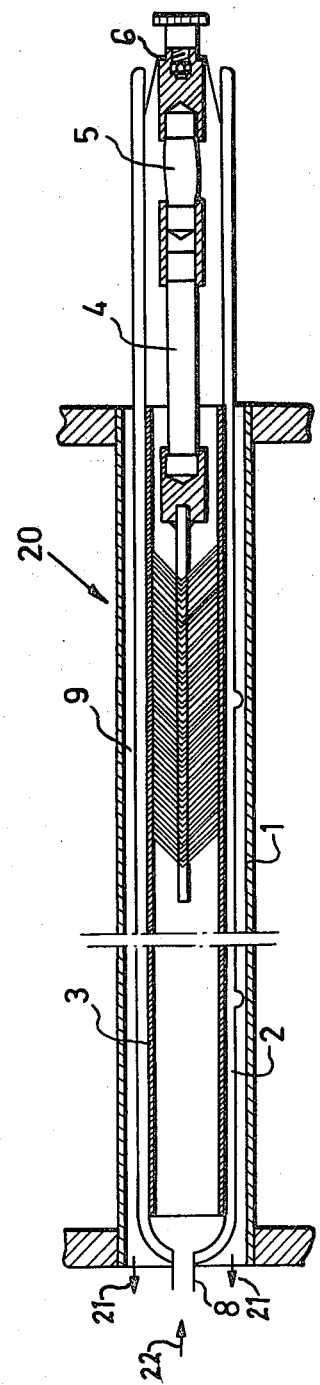
FIG. 2 shows a longitudinal axial sectional view of a further embodiment of the ozone pipe according to the invention, with cooling.

FIG. 2 shows an ozone pipe 20 which is essentially formed as the ozone pipe 10 according to FIG. 1, the difference being that the glass pipe 2 forming the dielectric material has a passage. The end of the glass pipe facing away from the contact 6 is provided with a nozzle 8 through which the medium 22 (air and/or gas) to be ozonized is supplied. The medium leaves at the other open end of the glass pipe, changes direction, is guided through the discharge chamber 9 between the glass pipe and the metal electrode 1, and leaves the ozone pipe 20 in the area of the nozzle 8, as shown by arrows 21.

We claim:

1. In an ozone production pipe for use with a plurality of such pipes in parallel in a large ozone production plant employing several hundred pipes, said production pipe comprising
   (a) a tubular body comprised of a dielectric material;
   (b) a metal jacket electrode encasing said body;
   (c) a counter-electrode in the form of a metal coating on the inside of said tubular body;
   (d) an electrical current supply connection mounted in one end of said tubular body;
   (e) means in said body providing electrical flow communication between said electrical current supply connection and said counter-electrode;
   (f) a high voltage fuse mounted in said flow communication means; the improvement characterized by
   (g) said high voltage fuse having a capacity within the range of between about 0.15 to 0.63 amperes; and
   (h) a resistance is mounted in said flow communication means in series with said fuse.

2. The apparatus of claim 1, further characterized by
   (a) the capacity of said high voltage fuse is about 0.2 amperes.

3. The apparatus of claim 1, further characterized by
   (a) said resistance is provided by an element that changes its resistance depending on the current.

4. The apparatus of claim 1, further characterized by
   (a) said resistance is a semi-conductor.

5. The apparatus of claim 1, further characterized by
   (a) said tubular body is open at the end thereof adjacent said power supply connection;
   (b) an air and/or gas supply nozzle is positioned in the end of said tubular body opposite said power supply connection; and
   (c) an annular discharge chamber is positioned between said tubular body and said metal jacket electrode;
   (d) whereby said annular discharge chamber serves as a return pipe for the medium treated and emerging from said ozone production pipe.

* * * * *